(12) United States Patent
Zhang et al.

(10) Patent No.: US 10,563,649 B2
(45) Date of Patent: Feb. 18, 2020

(54) HYDRAULIC FRACTURING SYSTEM AND METHOD FOR OPTIMIZING OPERATION THEREOF

(71) Applicant: Caterpillar Inc., Peoria, IL (US)

(72) Inventors: Yanchai Zhang, Dunlap, IL (US); Venkata Dandibhotla, Peoria, IL (US); Maurice Dust, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 425 days.

(21) Appl. No.: 15/481,074

(22) Filed: Apr. 6, 2017

(65) Prior Publication Data

US 2018/0291712 A1      Oct. 11, 2018

(51) Int. Cl.
| | |
|---|---|
| *F04B 47/00* | (2006.01) |
| *F16H 61/02* | (2006.01) |
| *F04B 51/00* | (2006.01) |
| *F04B 49/10* | (2006.01) |
| *E21B 41/00* | (2006.01) |
| *E21B 43/26* | (2006.01) |
| *F04B 17/05* | (2006.01) |
| *F04B 49/06* | (2006.01) |
| *F16H 63/42* | (2006.01) |
| *F16H 57/01* | (2012.01) |

(52) U.S. Cl.
CPC .......... *F04B 47/00* (2013.01); *E21B 41/0092* (2013.01); *E21B 43/26* (2013.01); *F04B 17/05* (2013.01); *F04B 49/065* (2013.01); *F04B 49/103* (2013.01); *F04B 51/00* (2013.01); *F16H 61/0213* (2013.01); *F16H 63/42* (2013.01); *F16H 57/01* (2013.01); *F16H 2057/012* (2013.01); *F16H 2063/426* (2013.01)

(58) Field of Classification Search
CPC ...... E21B 41/0092; E21B 43/26; F04B 17/05; F04B 47/00; F04B 47/02; F04B 47/04; F04B 47/06; F04B 49/06–065; F04B 49/20; F04B 51/00; F16H 59/68–78; F16H 61/02; F16H 61/0213; F16H 2061/0012–0018; F16H 2061/0096; F16H 2061/022; F16H 2061/0232; F16H 2061/1232; F16H 2061/161; F16H 2061/168
USPC .................. 417/15, 18, 19, 20, 34, 212, 223
See application file for complete search history.

(56) References Cited

U.S. PATENT DOCUMENTS 2,361,086 A  *  10/1944  Carlson ..................... F04B 9/02
                                                                      417/15
3,981,618 A  *   9/1976  Nelson, Jr. .............. F02D 29/04
                                                                      417/12

(Continued)

*Primary Examiner* — Alexander B Comley
(74) *Attorney, Agent, or Firm* — Harrity & Harrity LLP

(57) ABSTRACT

A hydraulic fracturing system includes an engine, transmission, and hydraulic fracturing pump. A driveshaft is coupled between the transmission and the hydraulic fracturing pump to transfer torque from the engine to the hydraulic fracturing pump. The hydraulic fracturing system also includes an advisory system including a display, a memory storing fuel consumption data and component durability data, and a controller. The controller is programmed to receive pump flow and pressure settings, identify an optimal transmission gear based on the pump flow and pressure settings, the fuel consumption data and the component durability data, and cause the optimal transmission gear to be displayed on the display.

20 Claims, 8 Drawing Sheets

(56) References Cited

U.S. PATENT DOCUMENTS

| | | | | |
|---|---|---|---|---|
| 4,925,370 A * | 5/1990 | Tallarita | F04C 14/08 | 417/15 |
| 5,474,428 A * | 12/1995 | Kimura | F16H 57/0439 | 192/48.92 |
| 5,848,877 A * | 12/1998 | Dill | F04B 49/065 | 417/44.2 |
| 6,655,922 B1 * | 12/2003 | Flek | F04D 15/0209 | 417/43 |
| 6,663,349 B1 * | 12/2003 | Discenzo | F04D 15/0245 | 417/300 |
| 7,901,314 B2 * | 3/2011 | Salvaire | F04B 9/02 | 475/72 |
| 7,987,916 B2 * | 8/2011 | Laskaris | A62C 5/02 | 169/20 |
| 8,506,267 B2 * | 8/2013 | Gambier | F04B 17/05 | 417/244 |
| 8,543,245 B2 * | 9/2013 | Heitman | F04B 49/065 | 137/836 |
| 9,410,546 B2 * | 8/2016 | Jaeger | F04B 51/00 | |
| 2006/0245934 A1 * | 11/2006 | Deivasigamani | F04B 17/00 | 417/212 |
| 2009/0312885 A1 | 12/2009 | Buiel | | |
| 2010/0174496 A1 * | 7/2010 | Adnan | F04B 51/00 | 702/34 |
| 2010/0300683 A1 * | 12/2010 | Looper | E21B 21/06 | 166/250.01 |
| 2013/0234515 A1 * | 9/2013 | Boone | E21B 44/00 | 307/43 |
| 2014/0219824 A1 * | 8/2014 | Burnette | F04B 23/06 | 417/53 |
| 2014/0229120 A1 * | 8/2014 | Luharuka | E21B 43/26 | 702/34 |
| 2015/0369351 A1 * | 12/2015 | Hermann | F16H 41/24 | 60/330 |
| 2016/0194942 A1 | 7/2016 | Herman | | |
| 2016/0195082 A1 * | 7/2016 | Wiegman | F04B 49/065 | 417/53 |
| 2016/0230512 A1 * | 8/2016 | Stephenson | E21B 44/00 | |
| 2016/0265457 A1 | 9/2016 | Stephenson | | |
| 2017/0082101 A1 * | 3/2017 | Urdaneta | F04B 51/00 | |
| 2017/0114625 A1 * | 4/2017 | Norris | E21B 47/0007 | |
| 2017/0234308 A1 * | 8/2017 | Buckley | E21B 43/26 | 417/53 |

* cited by examiner

HYDRAULIC FRACTURING SYSTEM AND METHOD FOR OPTIMIZING OPERATION THEREOF

TECHNICAL FIELD

The present disclosure relates generally to a hydraulic fracturing system, and more particularly to a system and method for identifying an optimal transmission gear.

BACKGROUND

Hydraulic fracturing is a means for extracting oil and gas from rock, typically to supplement a horizontal drilling operation. In particular, high pressure fluid is used to fracture the rock, stimulating the flow of oil and gas through the rock to increase the volumes of oil or gas that can be recovered. The system used to inject high pressure fluid, or fracturing fluid, includes, among other components, an engine, transmission, driveshaft and pump. Monitoring and prognostics for all aspects of this system are beneficial to initiate maintenance and reduce unplanned downtown.

U.S. Patent Application Publication No. 2016/0230512 to Stephenson et al. discloses a method of optimizing fuel consumption in equipment used in well site operations. The method includes calculating a set of fuel consumption rates for one or more engines at a job site as a function of engine speed, a hydraulic horsepower load to be provided by each engine, and an external parasitic load to be provided by each engine. The method also identifies one or more operating speeds for the one or more engines based on the fuel consumption rates, and operates the engines at the operating speeds during an operation at the well site.

As should be appreciated, there is a continuing need to improve efficiency and reliability of the equipment used in hydraulic fracturing.

SUMMARY OF THE INVENTION

In one aspect, a hydraulic fracturing system comprises an engine, transmission, and hydraulic fracturing pump. A driveshaft is coupled between the transmission and the hydraulic fracturing pump to transfer torque from the engine to the hydraulic fracturing pump. The hydraulic fracturing system also includes an advisory system including a display, a memory storing fuel consumption data and component durability data, and a controller. The controller is programmed to receive pump flow and pressure settings, identify an optimal transmission gear based on the pump flow and pressure settings, the fuel consumption data and the component durability data, and cause the optimal transmission gear to be displayed on the display.

In another aspect, a method for operating a hydraulic fracturing system is provided. The method comprises steps of receiving pump flow and pressure settings at a controller, identifying an optimal transmission gear, using the controller, based on the pump flow and pressure settings, fuel consumption data and component durability data, and displaying the optimal transmission gear on a display.

In yet another aspect, a control system for a hydraulic fracturing system includes a memory storing fuel consumption data and component durability data, and a controller. The controller is programmed to receive pump flow and pressure settings, identify an optimal transmission gear based on the pump flow and pressure settings, the fuel consumption data and the component durability data, and cause the optimal transmission gear to be displayed on a display.

DETAILED DESCRIPTION

Figure 1:
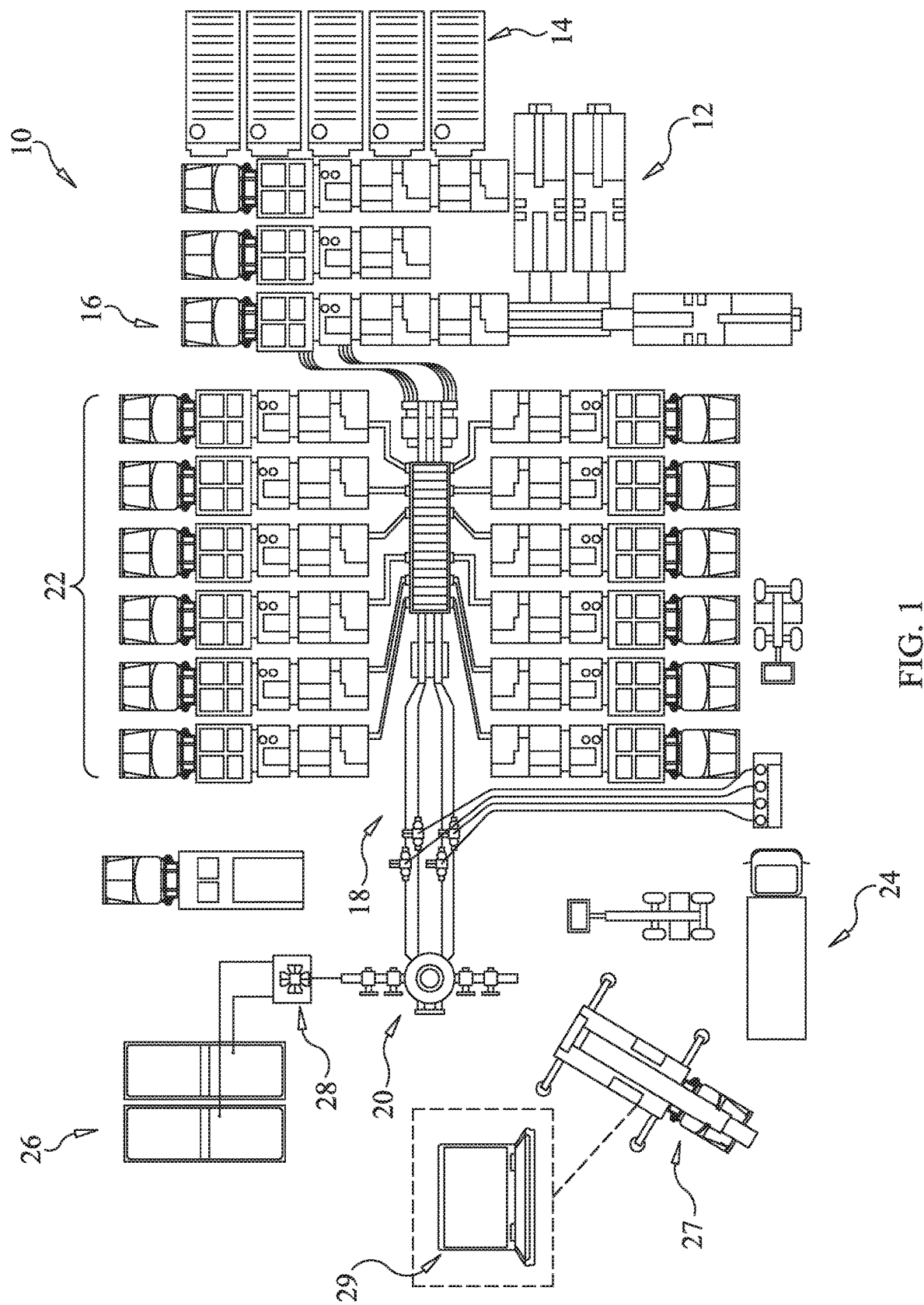
FIG. 1 is a schematic diagram of an exemplary hydraulic fracturing site, according to an aspect of the present disclosure.

An exemplary hydraulic fracturing site according to the present disclosure is shown generally at 10 in FIG. 1. In particular, FIG. 1 depicts an exemplary site layout according to a well stimulation stage (i.e., hydraulic fracturing stage) of a drilling/mining process, such as after a well has been drilled at the site 10 and the equipment used for drilling removed. The site 10 may include a fluid storage tank 12, a sand storage tank 14 and blending equipment 16 for preparing a fracturing fluid. The fracturing fluid, which may, for example, include water, sand, and one or more chemicals, may be injected at high pressure through one or more fluid lines 18 to a well head 20 using one or more hydraulic fracturing system(s) 22.

A bleed off tank 24 may be provided to receive bleed off liquid or gas from the fluid lines 18, as is known to those skilled in the art. In addition, and according to some embodiments, nitrogen, which may be beneficial to the hydraulic fracturing process for a variety of reasons, may be stored in tanks 26, with a pumping system 28 used to supply the nitrogen from the tanks 26 to the fluid lines 18 or well head 20.

The hydraulic fracturing process performed at the site 10, and the equipment used in the process, may be managed and/or monitored from a single location, such as a data monitoring system 27, or from multiple locations. According to an example, the data monitoring system 27 may be supported on a van, truck or may be otherwise mobile. As will be disclosed below, the data monitoring system 27 may include a display 29 for displaying data for monitoring performance and/or optimizing operation of the hydraulic fracturing systems 22. According to one embodiment, the data gathered by the data monitoring system 27 may be sent off-board or off-site for monitoring performance and/or performing calculations relative to the hydraulic fracturing site 10.

Figure 2:
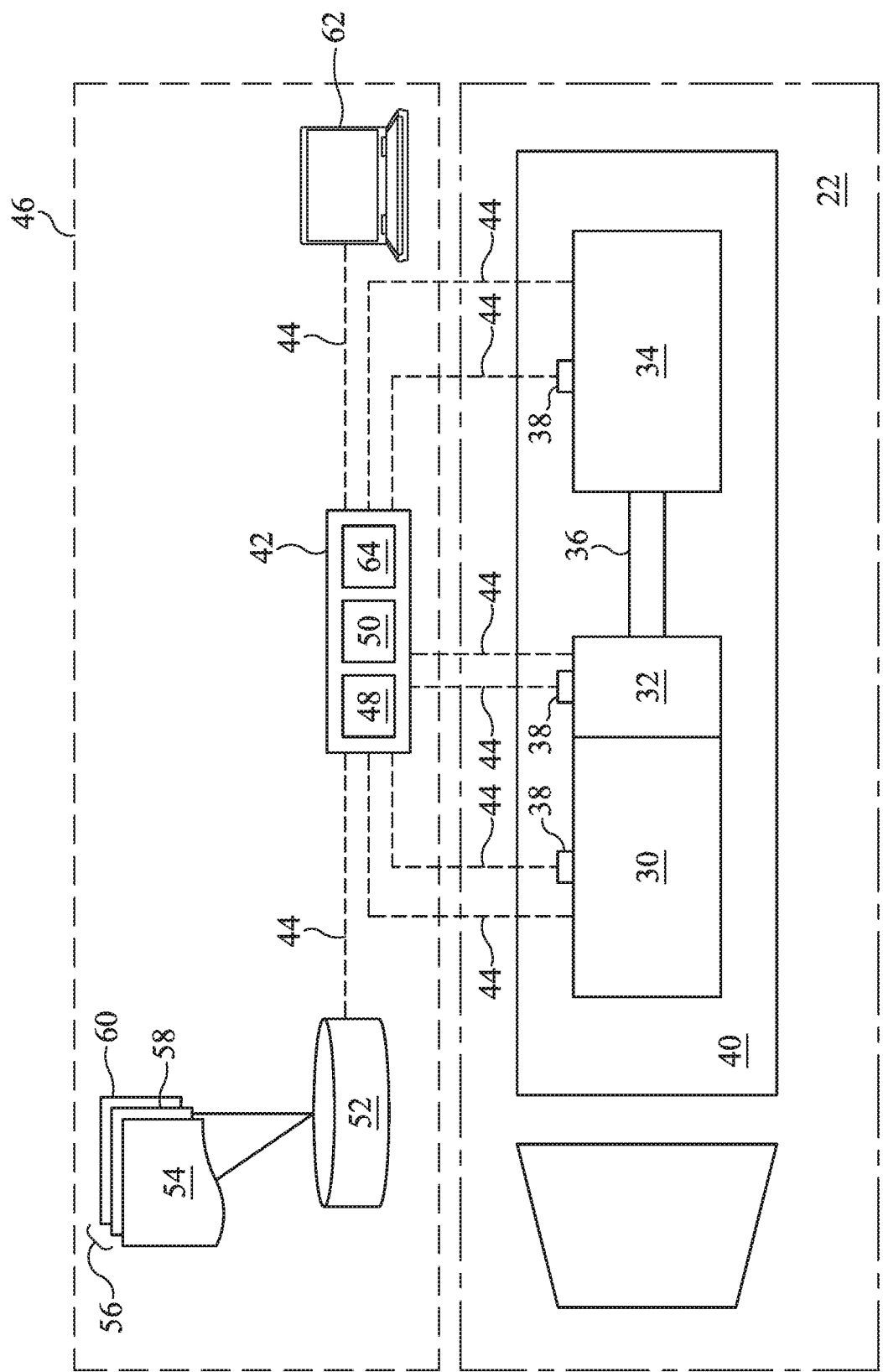
FIG. 2 is a schematic diagram of a hydraulic fracturing system of the hydraulic fracturing site of FIG. 1, including an advisory system, according to an aspect of the present disclosure.

Turning now to FIG. 2, the one or more hydraulic fracturing system(s) 22, according to the present disclosure, may each generally include an engine 30, or other source of power, a transmission 32, and a hydraulic fracturing pump 34. A driveshaft 36 may be coupled between the transmission 32 and the hydraulic fracturing pump 34 for transferring torque from the engine 30 to the hydraulic fracturing pump 34. One or more sensors 38 may be positioned and configured to detect or measure one or more physical properties related to operation and/or performance of the various components of the hydraulic fracturing system 22. This equipment (e.g., engine 30, transmission 32, and hydraulic fracturing pump 34) may be mobile, such as supported on a hydraulic fracturing rig 40, so that it may be more easily transported from site to site.

A controller 42, including a processor 48 and memory 50, may be provided, and may be part of, or may communicate with, an advisory system 46. The controller 42 and/or advisory system 46 may reside in whole or in part on the hydraulic fracturing rig 40, the data monitoring system 27 (FIG. 1), or elsewhere relative to the site 10. Further, the controller 42 and/or advisory system 46 may be configured to communicate with the sensors 38 and/or various other systems or devices via wired and/or wireless communication lines 44 to monitor and control various aspects of each of the engine 30, transmission 32, and hydraulic fracturing pump 34.

According to the present disclosure, the controller 42 may be programmed to execute an optimization program 64. The optimization program 64 may receive pump flow and pressure settings, such as those requested by an operator, and may utilize fuel consumption data 54 and component durability data 56, which may be stored in a database 52 or memory 50, to identify an optimal transmission gear. According to the exemplary embodiment, the component durability data 56 may include transmission gear life prediction data and pump cavitation prediction data 60. However, various other durability data may also be used.

Figure 3:
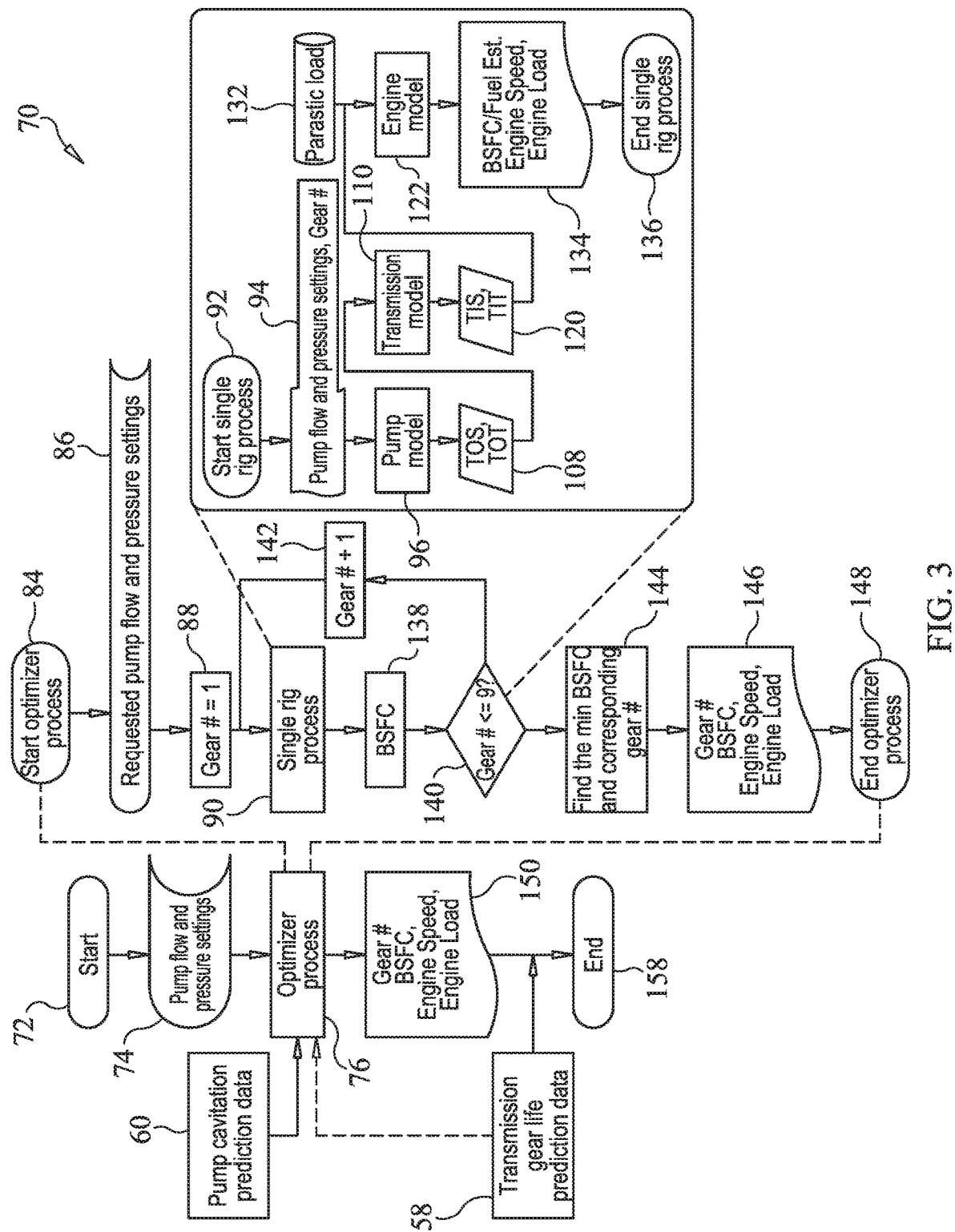
FIG. 3 is a flow diagram of an exemplary method of optimizing operation of the hydraulic fracturing system of FIG. 2, according to an aspect of the present disclosure.

A method of operating the hydraulic fracturing system 22 or, more particularly, optimizing operation of the hydraulic fracturing system 22, may include execution of the optimization program 64, which is illustrated as a flow diagram 70 in FIG. 3. The method may be implemented in whole or in part by the controller 42, with all or portions of the method running continuously or intermittently, such as at predetermined intervals.

Figure 4:
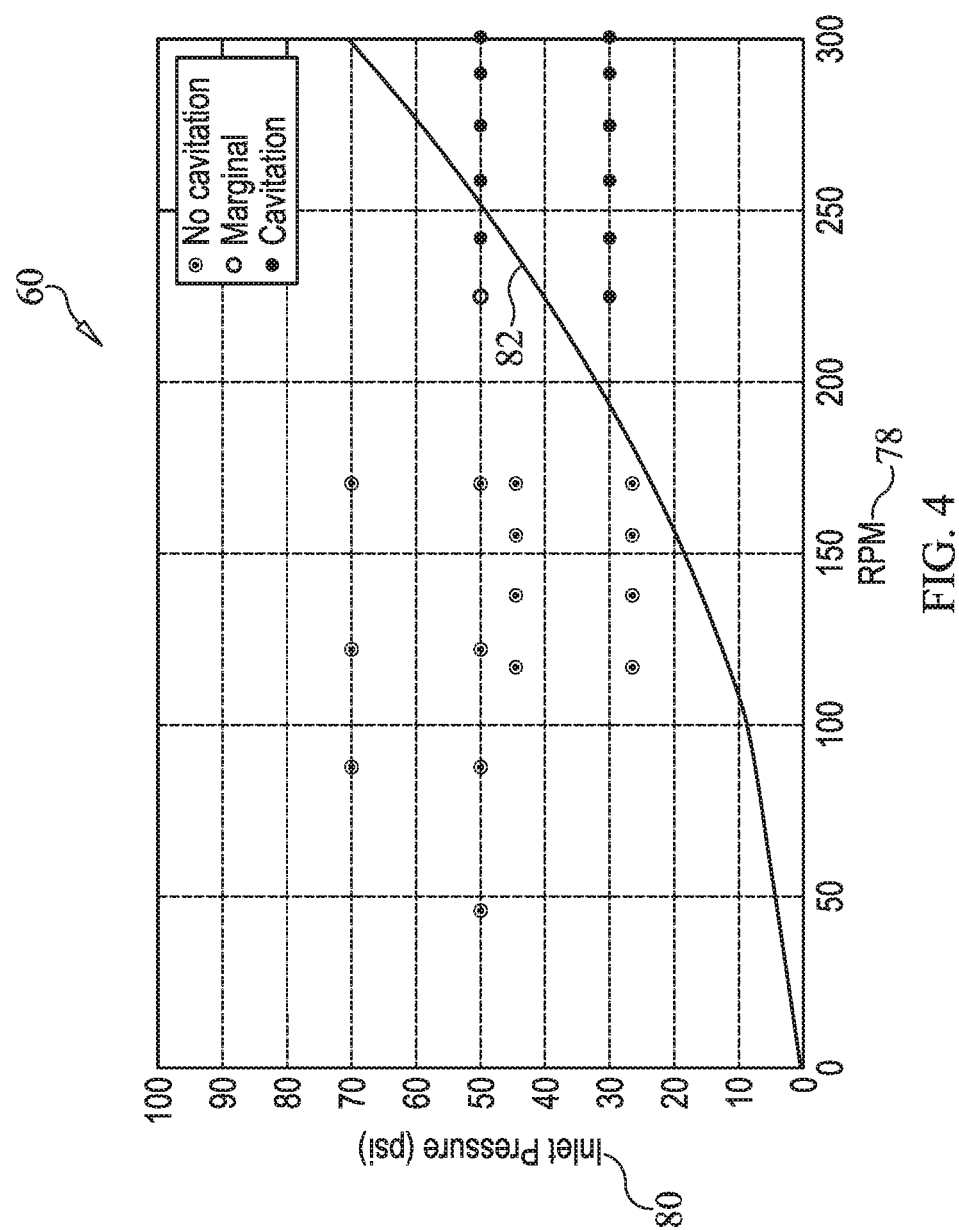
FIG. 4 is a graph depicting exemplary component durability data or, more specifically, pump cavitation prediction data, according to an aspect of the present disclosure.

The method begins at a start, box 72, and proceeds to box 74, at which pump flow and pressure settings are received. The pump flow and pressure settings may be provided as inputs to an optimizer process, at box 76. Prior to starting the optimizer process, or at another stage of the method, the pump cavitation prediction data 60 may be referenced to ensure that the pump flow and pressure settings do not correspond to a potential pump cavitation event. As shown in FIG. 4, the pump cavitation prediction data 60 may include pump speeds 78 along the x-axis and inlet pressure values 80 along the y-axis. Curve 82 may separate operating parameters in which a pump cavitation event has occurred or is likely to occur from operation in which a pump cavitation event is not likely to occur. The pump cavitation prediction data 60 of FIG. 4 is for cavitation prediction with water, with fluid properties, the curve 82 will change.

Figure 5:
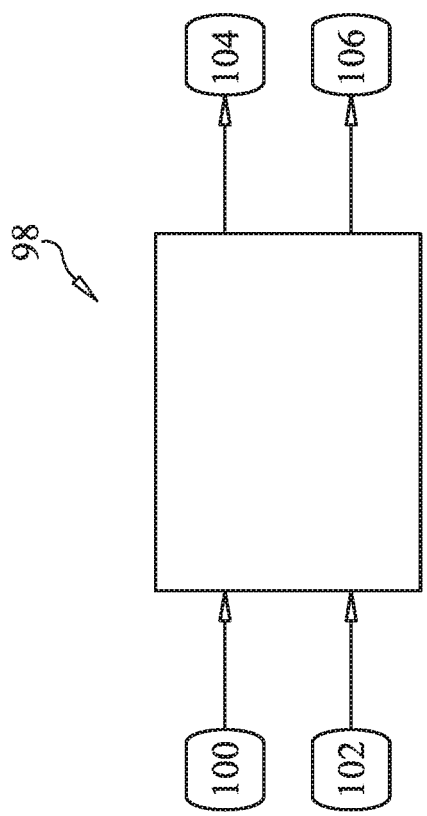
FIG. 5 is a diagram of an exemplary pump simulation model, for use with the method of FIG. 3, according to an aspect of the present disclosure.

At box 84, the optimizer process begins. The pump flow and pressure settings are received, at box 86, and gear one is selected at box 88. A single rig process is executed for gear one, at box 90. The single rig process begins at box 92, and receives as input the pump flow and pressure settings and the gear number for which the analysis is being performed, as shown at box 94. At box 96, a pump model corresponding to operation of the hydraulic fracturing pump 34 is utilized. The pump model, shown at 98 in FIG. 5, receives a pump flow 100 and a pump pressure 102, and generates a transmission output speed 104 and a transmission output torque 106, at box 108.

Figure 7:
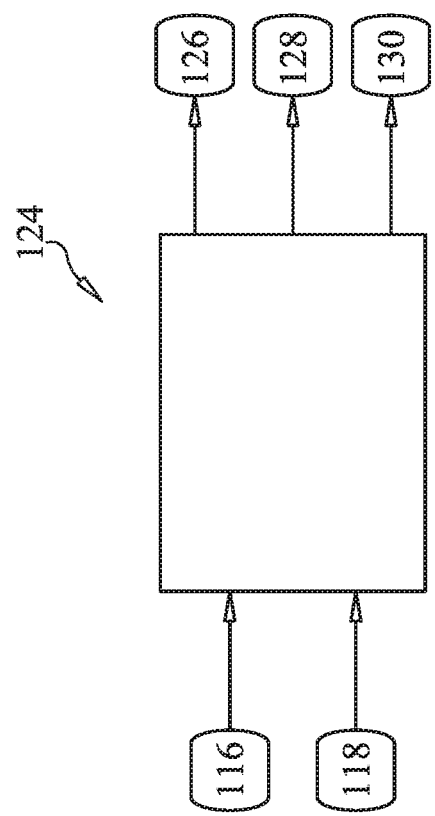
FIG. 7 is a diagram of an exemplary engine simulation model, for use with the method of FIG. 3, according to an aspect of the present disclosure.
Figure 6:
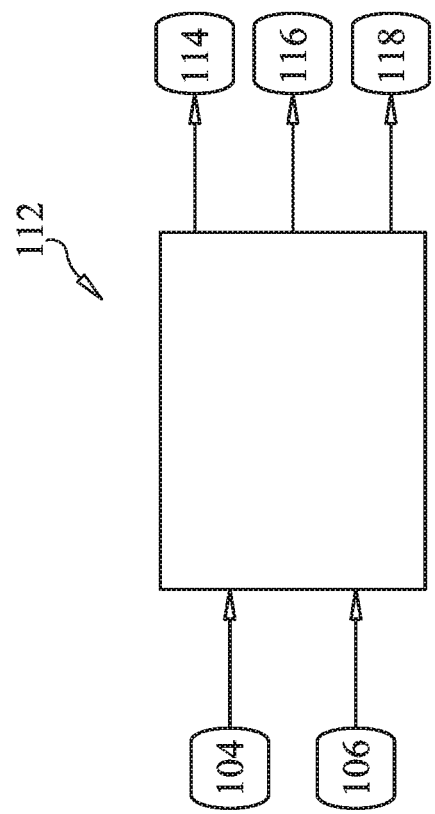
FIG. 6 is a diagram of an exemplary transmission simulation model, for use with the method of FIG. 3, according to an aspect of the present disclosure.

At box 110, a model corresponding to operation of the transmission 32 is utilized. The transmission model, shown at 112 in FIG. 6, receives the transmission output speed 104 and the transmission output torque 106 as inputs, and generates a transmission input speed 114, a transmission input torque 116, and an engine speed 118, at box 120. At box 122, a model corresponding to operation of the engine 30 is called. The engine model, shown at 124 in FIG. 7, receives the engine speed 118 and transmission input torque 116, and generates a brake specific fuel consumption (BSFC) value 126, an engine speed 128, and an engine load 130, all corresponding to gear one. It is shown that, at box 132, parasitic loads on the engine 30 are also accounted for, and the BSFC value 126, engine speed 128, and engine load 130 are all returned, at box 134.

The single rig process ends at box 136, with the BSFC value 126 being calculated, at box 138. The method determines if all gears have been evaluated, at box 140, and, if not, the gear number is incremented, at box 142, and the single rig process is executed again for the next gear, at box 90. Once it has been determined that BSFC values 126 have been identified for each of the transmission gears, the minimum BSFC value 126 and corresponding gear number are selected, at box 144. In particular, the gear number, BSFC value 126, engine speed 128, and engine load 130 are returned, at box 146, and the optimizer process ends, at box 148.

Figure 8:
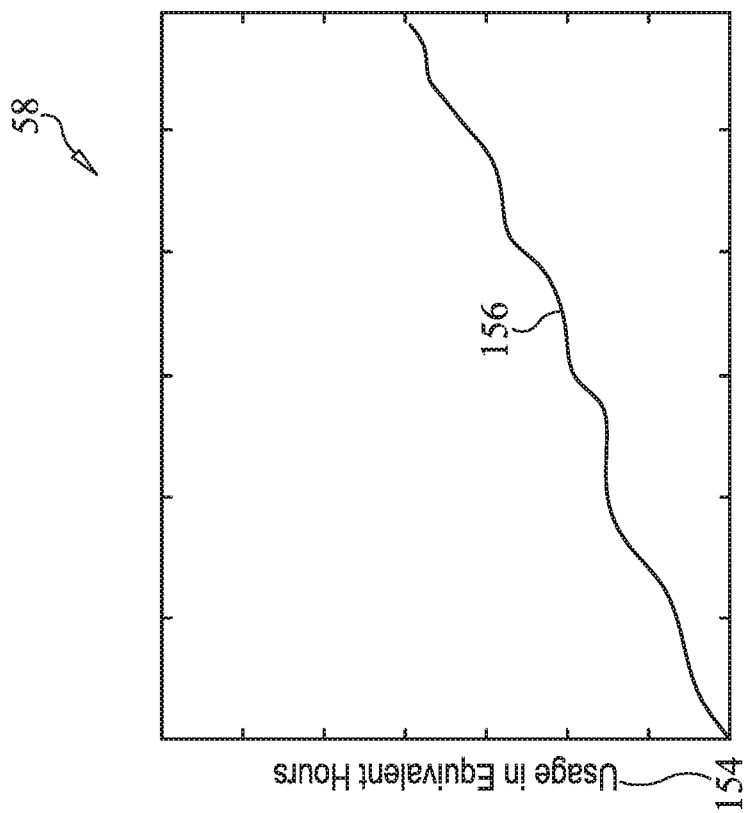
FIG. 8 is a graph depicting exemplary component durability data or, more specifically, transmission gear life prediction data, according to an aspect of the present disclosure.

The optimal transmission gear, and corresponding data, are returned, at box 150. The optimal transmission gear may be analyzed relative to the transmission gear life prediction data 58, shown in FIG. 8, which may include days 152 along the x-axis and usage in equivalent hours 154 along the y-axis. A curve 156 may represent usage hours 154 corresponding to days 152 for a transmission gear. If the predicted gear life of the optimal transmission gear is outside a desirable range, a different optimal transmission gear may be selected, by returning to the optimizer process, at box 76.

Once the optimizer process is executed and constraints regarding component durability are applied, the optimal transmission gear is identified and the method ends, at box 158. The optimal transmission gear may be displayed on the operator display 62 of the advisory system and/or the display 29 of the data monitoring system 27. Additionally, or alternatively, the hydraulic fracturing system 22 may be configured to automatically shift a gear of the transmission 32 to the optimal transmission gear.

Figure 9:
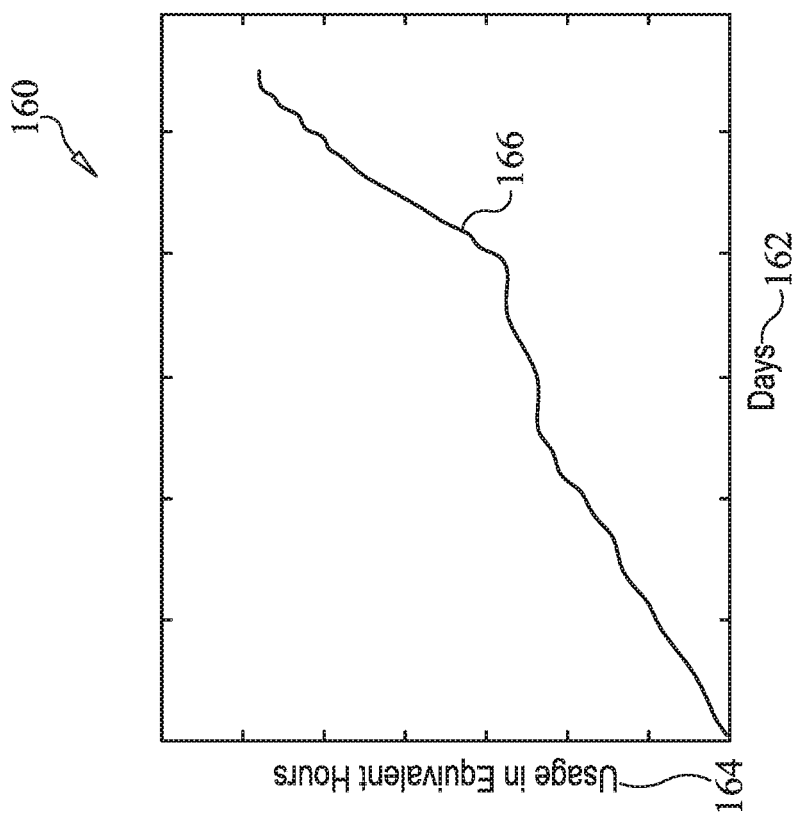
FIG. 9 is a graph depicting exemplary component durability data or, more specifically, pump life prediction data, according to an aspect of the present disclosure.

Considerations, in addition to fuel economy, which may be considered relative to BSFC data and/or other fuel consumption data 54, and component durability may also be incorporated into the optimization strategy of the present disclosure. For example, additional component durability data 56 may include pump life prediction data 160, as shown in FIG. 9. The pump life prediction data 160 may include days 162 along the x-axis and usage in equivalent hours 164 along the y-axis. Curve 166 may represent usage hours 164 corresponding to days 162 for the hydraulic fracturing pump 34. Predicted pump life may also be a factor that is considered in the optimization strategy.

Figure 10:
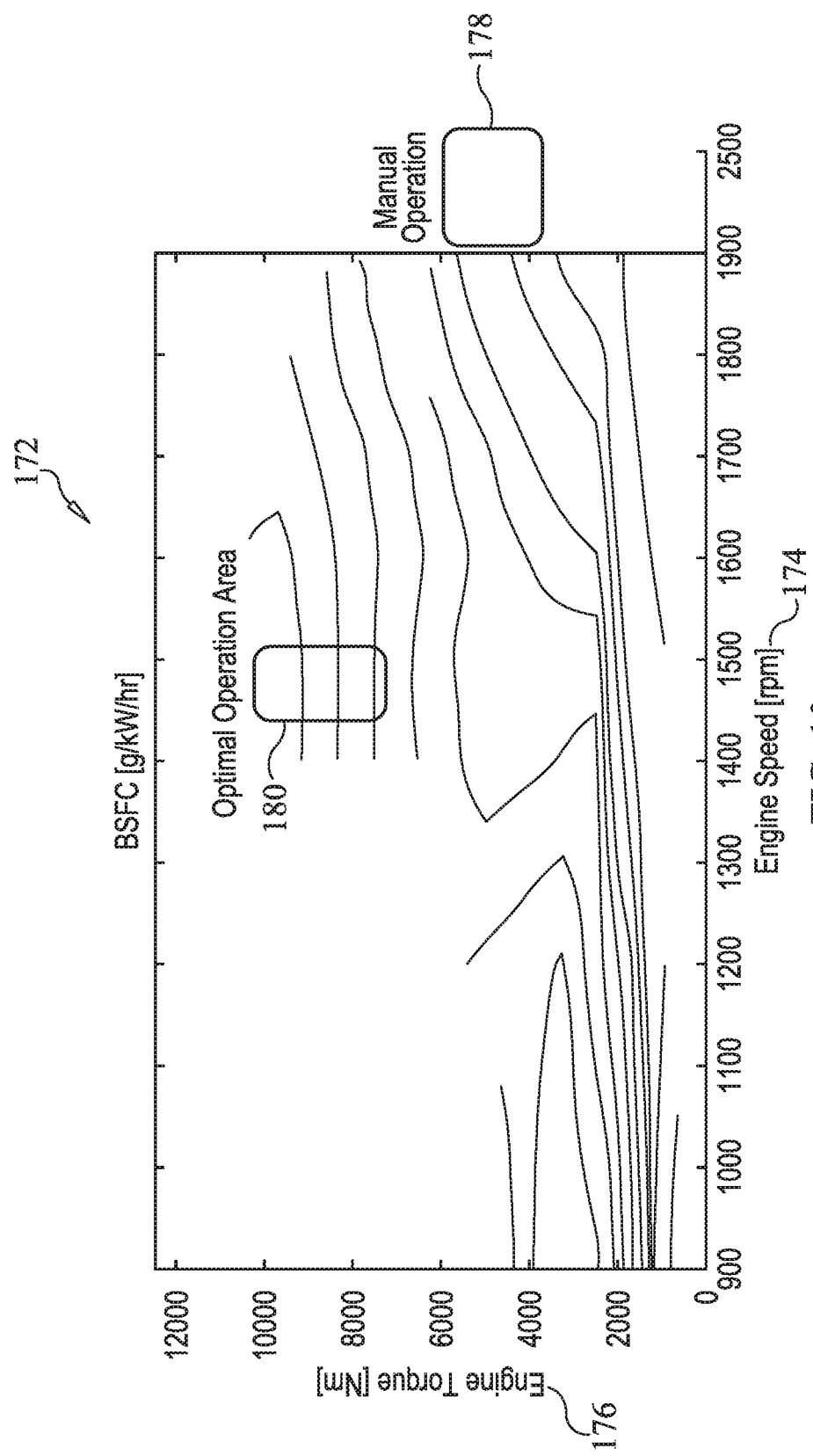
FIG. 10 is a graph depicting exemplary fuel consumption data or, more specifically, brake specific fuel consumption data, according to an aspect of the present disclosure.

Turning now to FIG. 10, a BSFC map 172 is shown. Engine speed 174 is depicted along the x-axis and engine torque 176 is depicted along the y-axis. The BSFC map 172 analyzes the fuel efficiency of the engine 30 and generally represents the rate of fuel consumption divided by the power produced. Depicted on the BSFC map 172 are a set of efficiency values 178 corresponding to manual operation and a set of efficiency values 180 corresponding to optimized operation.

Modifications and/or customizations may be made to the optimization strategy of the present disclosure without deviating from the intended scope. For example, factors in addition to fuel economy and durability may be used. Also, the data used for the factors, including fuel economy and durability, may vary depending on the application. Further, a weight factor may be applied to fuel economy, durability data, and/or other factors to arrive at an appropriate balance.

INDUSTRIAL APPLICABILITY

The present disclosure relates generally to a hydraulic fracturing system. More particularly, the present disclosure relates to optimizing operation of the hydraulic fracturing system. Yet further, the present disclosure is applicable to a system and method for identifying an optimal transmission gear based on fuel consumption data and component durability data.

Referring generally to FIGS. 1-11, a hydraulic fracturing system 22 generally includes an engine 30, transmission 32, hydraulic fracturing pump 34 and a driveshaft 36 coupled between the transmission 32 and the hydraulic fracturing pump 34. Currently, operation of hydraulic fracturing systems 22, including selection of the transmission gear, is done manually. As such, the operating performance of the hydraulic fracturing system 22 may be limited by the experience of the operator, without regard to fuel economy or durability.

According to the present disclosure, a system and method for optimizing operation of the hydraulic fracturing system 22 is provided. A controller 42, including a processor 48 and memory 50, may be provided, and may be part of, or may communicate with, an advisory system 46. The advisory system 46 or, more specifically, the controller 42 may be configured to execute an optimization program 64, the primary steps of which are illustrated in a flow diagram 190 of FIG. 11.

Figure 11:
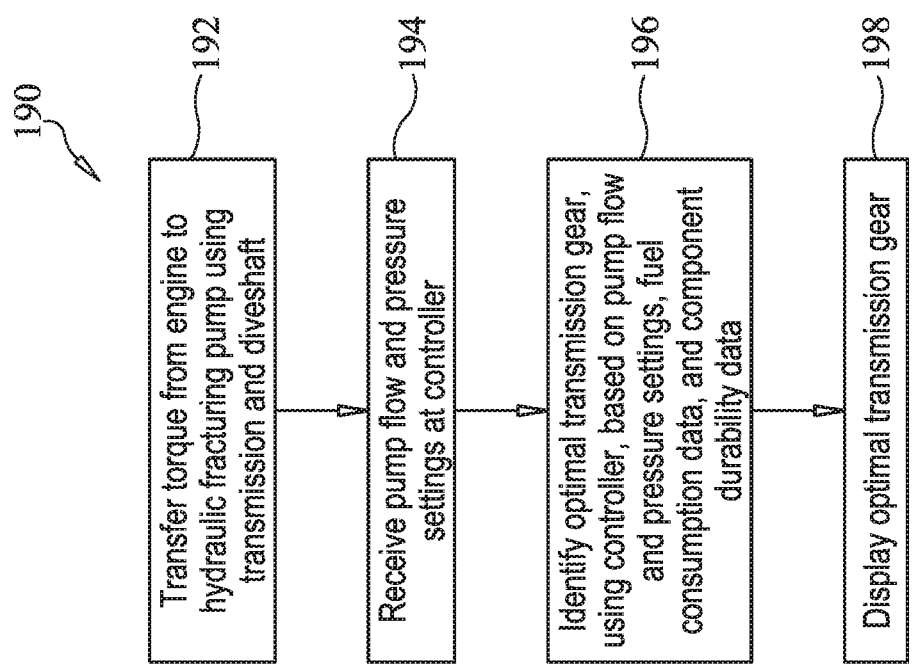
FIG. 11 is a flow diagram of the primary steps of the method of optimizing operation of the present disclosure.

During operation of the hydraulic fracturing system 22, torque is transferred from the engine 30 to the hydraulic fracturing pump 34 using the transmission 32 and the driveshaft 36, at box 192 of FIG. 11. At box 194, the optimization program 64 receives pump flow and pressure settings at the controller 42. The controller 42 then uses the pump flow and pressure settings, fuel consumption data 54, and component durability data 56 to identify an optimal transmission gear, at box 196. The optimal transmission gear may be displayed on one of displays 29 or 62, or otherwise communicated to the operator, at box 198.

In addition to fuel economy, the disclosed optimization strategy considers durability of various components of the hydraulic fracturing system 22. As such, the optimization strategy provides a means for operating the hydraulic fracturing system 22 in a more fuel efficient manner, while also avoiding operation that may lead to premature damage or failure, and extending the life of the components of the hydraulic fracturing system 22.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A hydraulic fracturing system, comprising: an engine; a transmission; a hydraulic fracturing pump; a driveshaft coupled between the transmission and the hydraulic fracturing pump to transfer torque from the engine to the hydraulic fracturing pump using the transmission and the driveshaft; a memory storing component durability data; and
   a controller programmed to: receive information identifying pump flow and pressure settings; identify an optimal transmission gear based on the pump flow and pressure settings and the component durability data, the component durability data including transmission gear life prediction data and pump cavitation prediction data, and wherein the pump cavitation prediction data includes inlet pressure values corresponding to a potential pump cavitation event; and provide information identifying the optimal transmission gear.

2. The hydraulic fracturing system of claim 1, wherein the pump cavitation prediction data further includes pump speeds corresponding to the potential pump cavitation event.

3. The hydraulic fracturing system of claim 1, wherein the pump cavitation prediction data further includes fluid properties of a fracturing fluid.

4. The hydraulic fracturing system of claim 1, wherein, when identifying the optimal transmission gear, the controller is further programmed to:
   apply a weight factor to a transmission gear life estimation.

5. The hydraulic fracturing system of claim 1, wherein the optimal transmission gear is identified further based on pump life prediction data.

6. A method for operating a hydraulic fracturing system, the method comprising steps of: transferring torque from an engine to a hydraulic fracturing pump using a transmission and a driveshaft; receiving, by a controller, information identifying pump flow and pressure settings; identifying an optimal transmission gear, using the controller, based on the pump flow and pressure settings and component durability data, the component durability data including transmission gear life prediction data and pump cavitation prediction data, and wherein the pump cavitation prediction data includes inlet pressure values corresponding to a potential pump cavitation event; and provide information identifying the optimal transmission gear.

7. The method of claim 6, wherein the optimal transmission gear is identified further based on the fuel consumption data.

8. The method of claim 6, wherein identifying the optimal transmission gear includes identifying the optimal transmission gear by avoiding gears in which the inlet pressure values correspond to the potential pump cavitation event.

9. The method of claim 6, wherein identifying the optimal transmission gear includes identifying the optimal transmission gear by applying a weight factor to a transmission gear life estimation based on the transmission gear life prediction data.

10. The method of claim 6, further comprising automatically shifting a gear of the transmission to the optimal transmission gear.

11. The method of claim 6, further comprising evaluating gear life of the optimal transmission gear and, if the gear life is outside a desirable range, selecting a different optimal transmission gear.

12. The method of claim 6, wherein the optimal transmission gear is identified further based on pump life prediction data.

13. A control system for a hydraulic fracturing system, including: a memory storing component durability data; and a controller programmed to: receive information identifying pump flow and pressure settings; identify an optimal transmission gear based on the pump flow and pressure settings and the component durability data, the component durability data including transmission gear life prediction data and pump cavitation prediction data, and wherein the pump cavitation prediction data includes inlet pressure values corresponding to a potential pump cavitation event; and provide information identifying the optimal transmission gear.

14. The control system of claim 13, wherein the pump cavitation prediction data further includes pump speeds corresponding to the potential pump cavitation event.

15. The control system of claim 13, wherein, when identifying the optimal transmission gear, the controller is programmed to apply a weight factor to a transmission gear life estimation.

16. The control system of claim 13, wherein the optimal transmission gear is identified further based on a pump model corresponding to a hydraulic fracturing pump of the hydraulic fracturing system.

17. The control system of claim 13, where, wherein, when identifying the optimal transmission gear, the controller is programmed to:
    determine, based on the transmission gear life prediction data, a predicted gear life of a different transmission gear;
    determine that the predicted gear life of the different transmission gear is outside a desirable range; and
    select the optimal transmission gear based on determining that the predicted gear life of the different transmission gear is outside the desirable range.

18. The control system of claim 13, wherein, when providing the information identifying the optimal transmission gear, the controller is programmed to:
    provide, for display, the information identifying the optimal transmission gear.

19. The control system of claim 13, wherein the controller is further programmed to:
    automatically shift a gear of the transmission to the optimal transmission gear.

20. The control system of claim 13, wherein the optimal transmission gear is identified further based on pump life prediction data.

\* \* \* \* \*